Figure 1:
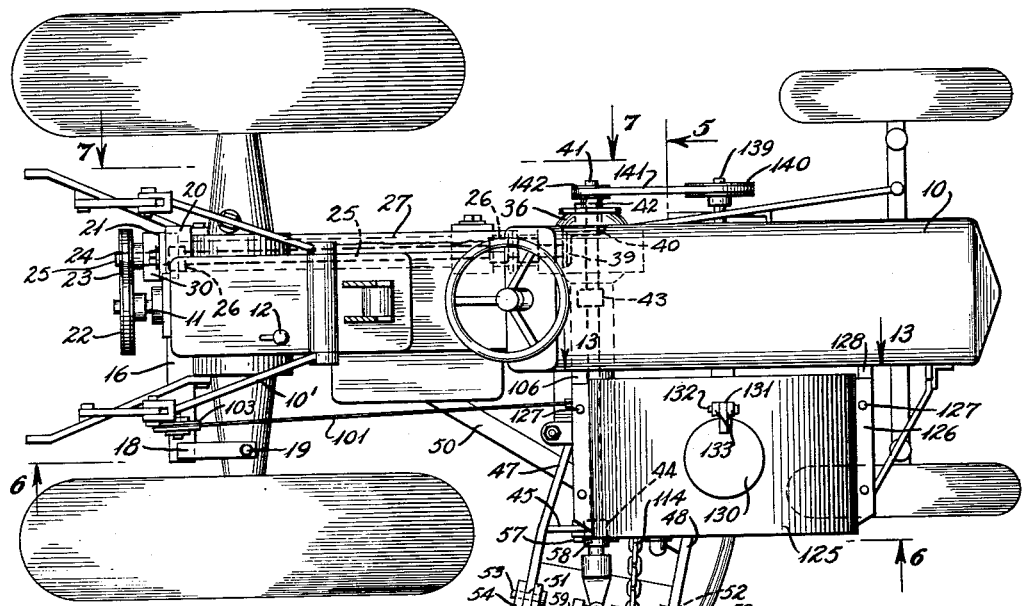

Dec. 12, 1961     A. C. PAWELA     3,012,371

BANKER AND SPRAYER

Filed Oct. 2, 1959                               5 Sheets-Sheet 1

Inventor
Albert C. Pawela

By
Attorney

Dec. 12, 1961  A. C. PAWELA  3,012,371
BANKER AND SPRAYER
Filed Oct. 2, 1959  5 Sheets-Sheet 2

Inventor
Albert C. Pawela

By
Attorney

Dec. 12, 1961    A. C. PAWELA    3,012,371
BANKER AND SPRAYER
Filed Oct. 2, 1959    5 Sheets-Sheet 3
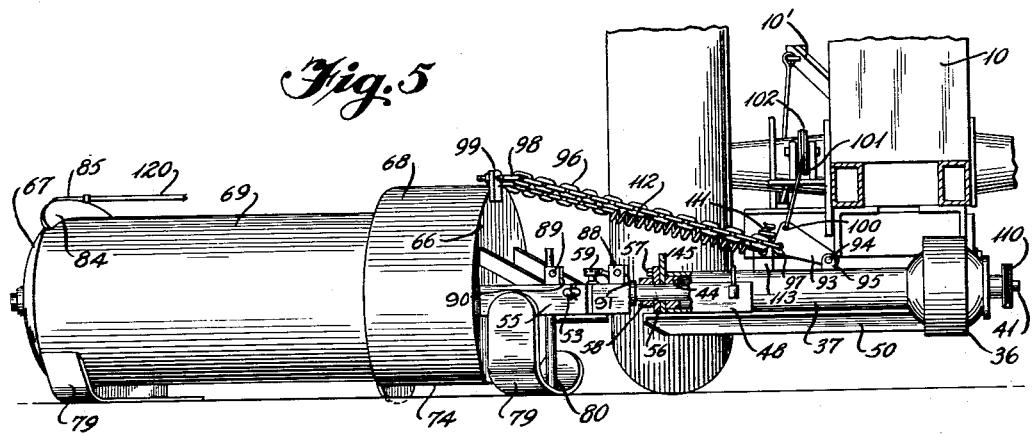
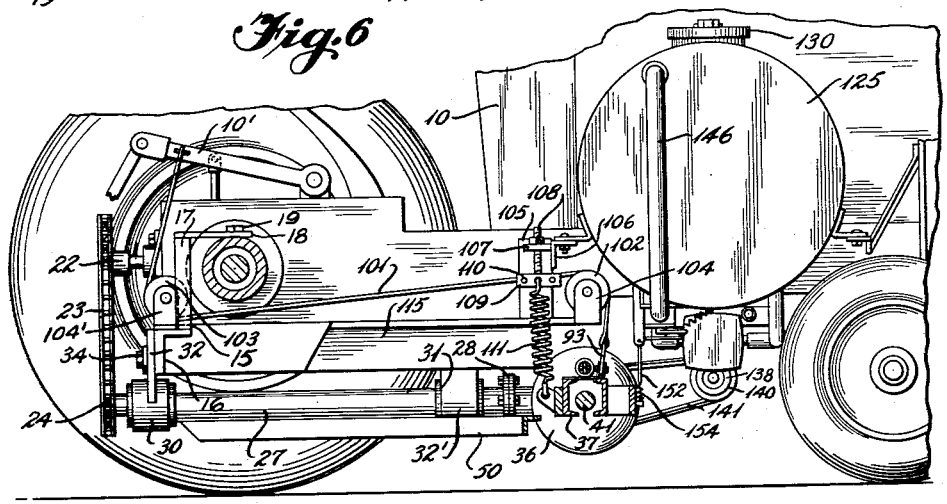
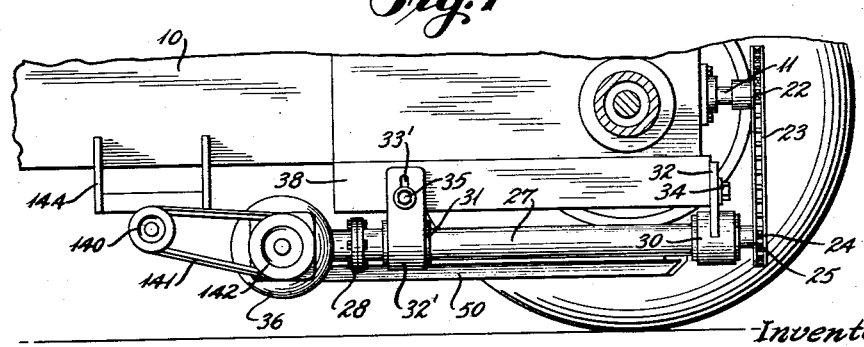
Inventor
Albert C. Pawela
By
Attorney

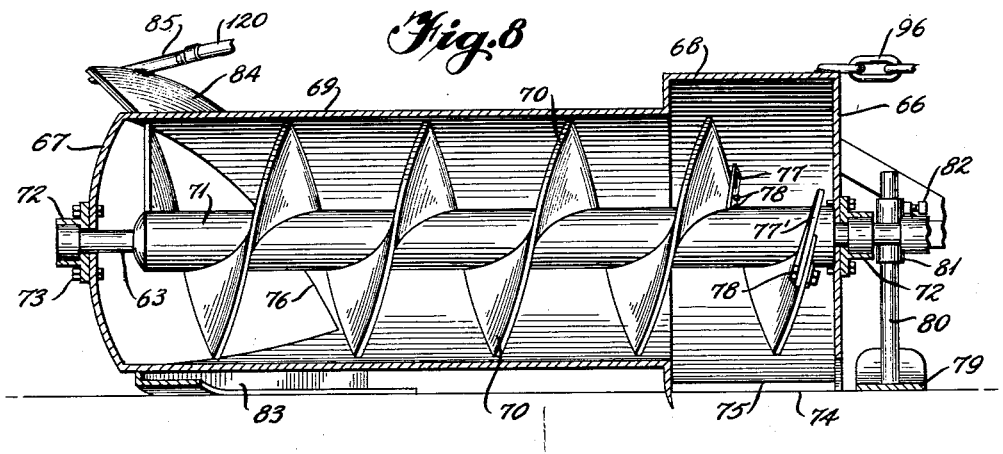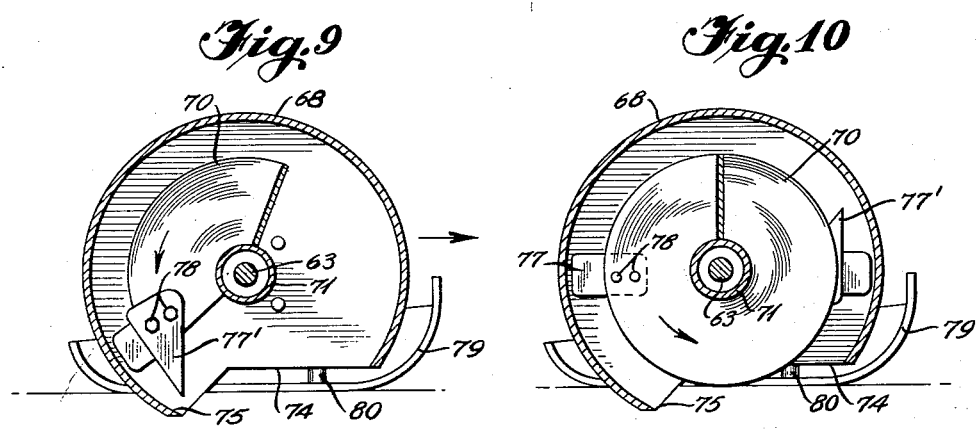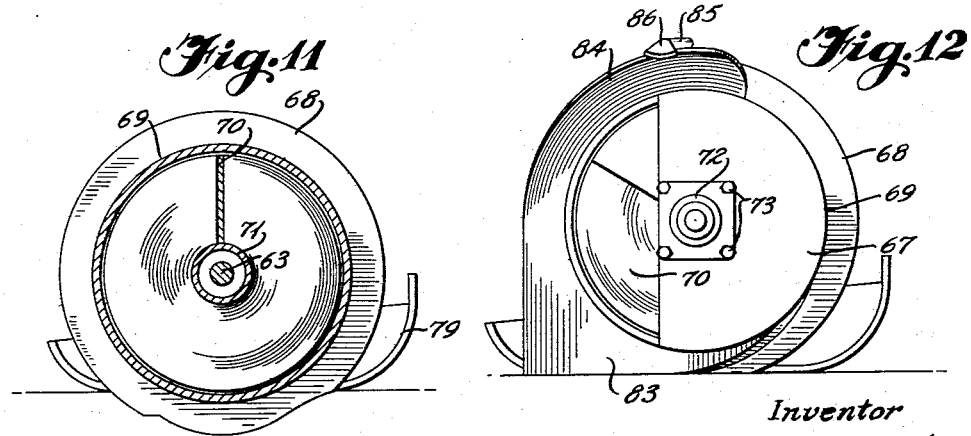

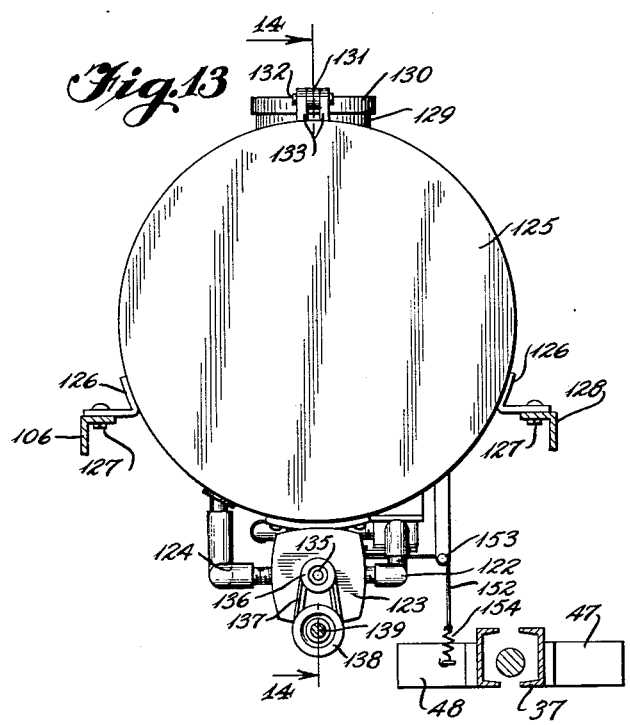
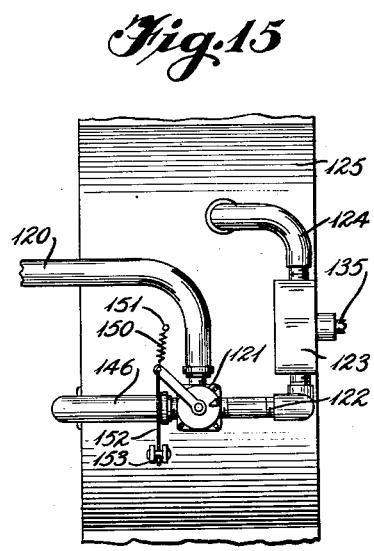
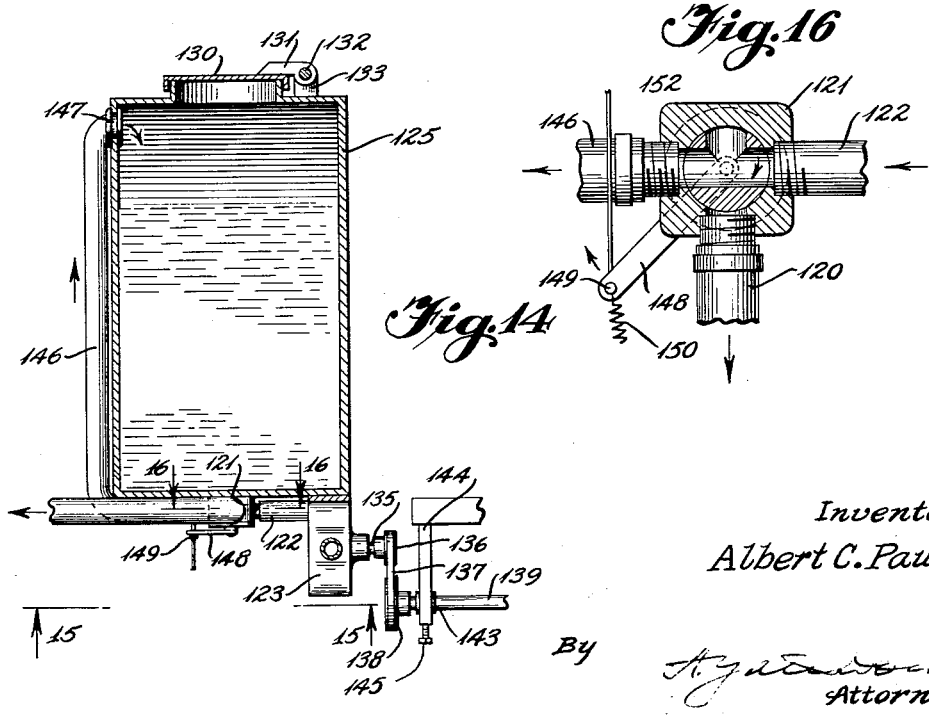

United States Patent Office 3,012,371
Patented Dec. 12, 1961

3,012,371
BANKER AND SPRAYER
Albert C. Pawela, Eustis, Fla., assignor of one-half to Dillard Tractor Company, Inc., Eustis, Fla.
Filed Oct. 2, 1959, Ser. No. 843,961
8 Claims. (Cl. 47—1.7)

This invention relates to the cultivation of the soil and the movement of the same in connection with plant life, and to the equipment employed including that for providing a bank of earth around trees and the like to promote growth and to protect them from the elements.

The invention relates particularly to cultivators, fertilizer distributors, bankers or hillers, debankers, ringers, and other instruments or devices used in the care and cultivation of plant life and especially to equipment designed to provide a bank of earth around a plant with a minimum of effort and in a minimum of time.

Cultivators or hoes have been produced, including those mounted on tractors, with laterally extending implements adapted to be raised and lowered and driven from a tractor and these have been used to move the earth close to the plant or provide a bank for the protection of the plant. The provision of a bank of earth around a plant has been one of the requirements of insurance companies but it has not been easy to provide the same with machines already in existence due to their size, the limitations of their maneuverability, and for other reasons.

It is an object of the invention to provide a device for banking earth around a tree or plant and which device can be readily substituted on a tractor for the earth engaging portion of a tractor mounted cultivator or hoe and utilized to move the earth to produce a bank simply and with a minimum of effort and time.

Another object of the invention is to provide an earth banking device including a screw for moving the earth in an amount to produce a bank of any desired size or sufficient to satisfy insurance requirements, as well as a device for providing a ring of earth around a tree or plant and for simultaneously spraying the base of the tree to deter harmful insects as well as to provide a bank of sufficient density and with the surface thereof of said inclination that such bank will remain intact and not have to be rebuilt or rebanked during a season.

A further object of the invention is to produce a bank without exposing or interfering with the roots of the plant and with a machine which will not pick up undesirable foreign material, as well as a machine which not only can be used for producing a bank but which can be employed to provide a ring of earth about and in spaced relation to a plant so that water or other substance can be confined around the plant within such ring of earth.

A further object of the invention is to provide a device by which both a bank and ring of earth can be provided and simultaneously a substance applied by spraying and driven from the tractor with the amount of time and effort involved relatively small.

Figure 17:
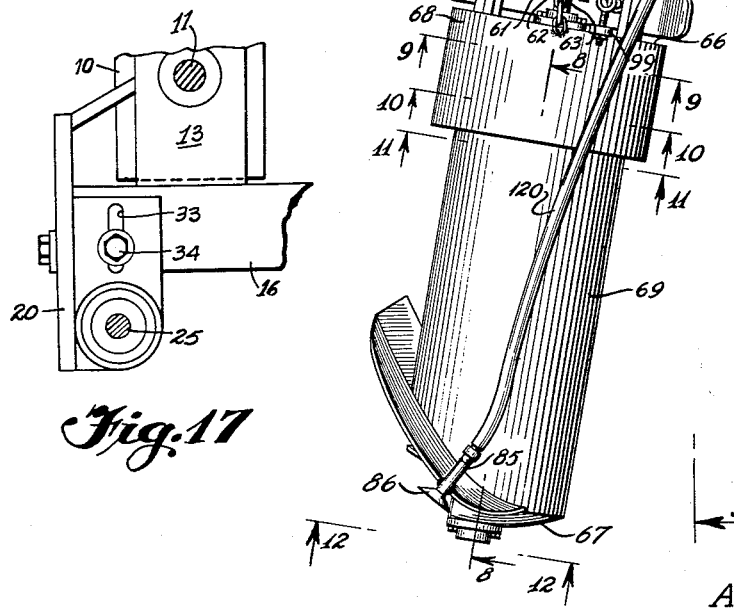
Figure 2:
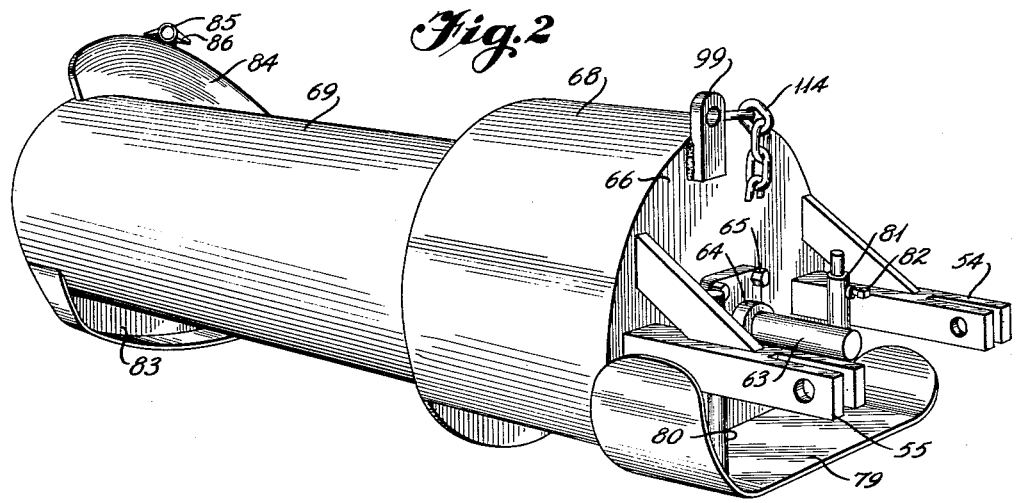
Figure 3:
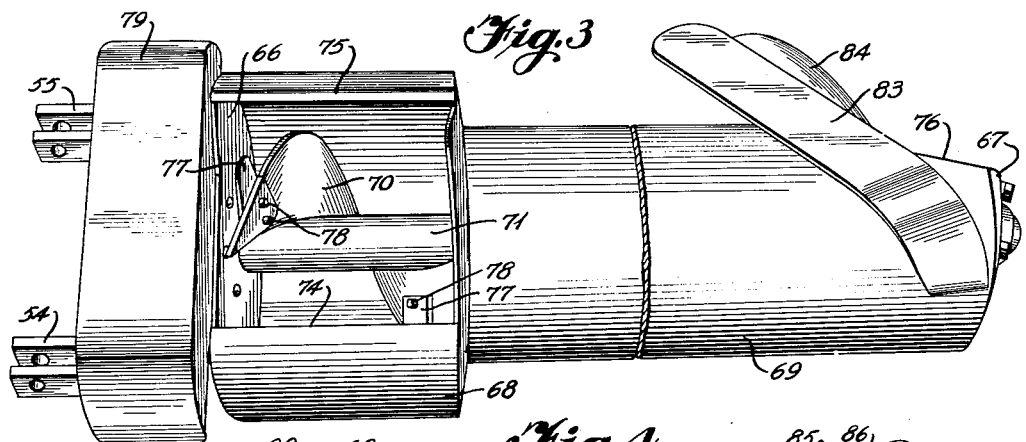
Figure 4:
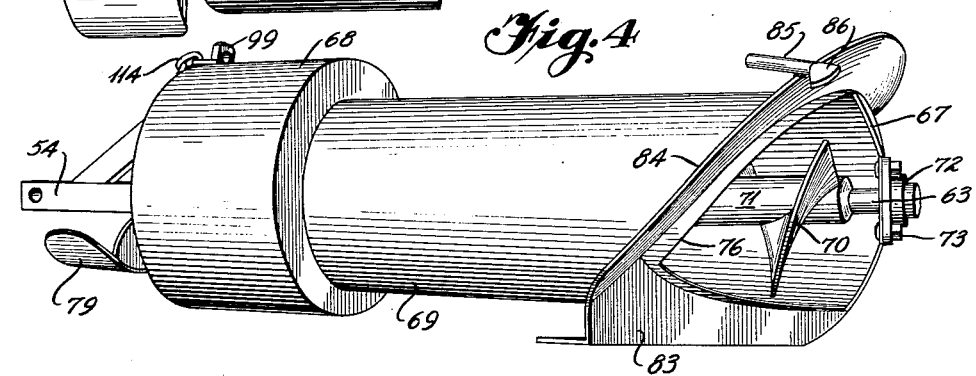

Other objects and advantages of the invention will be apparent from the following description considered in conjunction with the accompanying drawings, wherein:

FIG. 1 is a top plan view illustrating one application of the invention as applied to a tractor;
FIG. 2, a perspective of the banker itself;
FIG. 3, a bottom plan view;
FIG. 4, a side elevation;
FIG. 5, a section on the line 5—5 of FIG. 1;
FIG. 6, a section on the line 6—6 of FIG. 1;
FIG. 7, a section on the line 7—7 of FIG. 1;
FIG. 8, a section on the line 8—8 of FIG. 1;
FIGS. 9, 10 and 11, sections, respectively, on the lines 9—9, 10—10 and 11—11 of FIG. 1;
FIG. 12, an end elevation viewed on the line 12—12 of FIG. 1;
FIG. 13, an enlarged sectional view taken on the line 13—13 of FIG. 1;
FIG. 14, a section on the line 14—14 of FIG. 13;
FIG. 15, a fragmentary bottom elevation of the sprayer taken on line 15—15 of FIG. 14; and
FIG. 16, a fragmentary enlarged detail section on the line 16—16 of FIG. 14.
FIG. 17 is a rear elevation, partially in section, of certain details.

Briefly stated, the banker and sprayer of the present invention are mounted on a tractor and are driven from the power take-off of the tractor with a shear coupling incorporated therein to yield and prevent damage when an obstruction is encountered. Mounting mechanism is provided on the tractor and which can be raised and lowered and on this mounting mechanism and the drive through the same are carried the banker and ringer, and sprayer. The banker and ringer comprises a generally cylindrical casing of approximately 36" in length and 12½" in diameter with an extension approximately 12" in length and 18" in diameter. This cylindrical housing or casing is mounted for raising and lowering movement on the mounting mechanism and contains openings in the portion of larger size, with an opening at its free end and with a cutting blade or scoop on the side of the opening near the rear wheel for lifting earth into the cylindrical housing. Lengthwise of the housing, supported by end bearings, is a shaft with a screw about the same, the portion of the screw within the larger portion of the housing having spaced cutters for extending into the soil and loosening the same before it is engaged and raised by the scoop, the soil being carried through the smaller portion of the housing at the outer end where it is discharged from an opening having a border flange for shaping and providing angularity to a bank of earth moved by the screw conveyor to a position around the plant.

With continued reference to the drawings, a tractor 10, of conventional construction, has a power drive including a shaft 11 extending from its rear and from which shaft various devices may be driven. The operation of the shaft 11 is controlled through a clutch of known construction by a lever 12.

An upright plate or arm 13 is mounted about the end of the power takeoff by bolts, and to the lower end of such plate is attached a horizontal plate or shelf member 15 which supports a transverse angle bar 16 to the end of which adjacent the right-hand side of the tractor is attached an upright post 17 topped with a horizontal plate or cap 18, secured by a bolt 19 to the tractor rear axle housing adjacent the wheel at the right-hand side thereof. Reference is made to my Patent No. 2,974,616 for a further disclosure of these and other details of the tractor and its power take off.

The opposite or left-hand end of the angle bar 16 is provided with a mounting plate 20 across the end thereof in vertical position to the angle bar 16, such plate being welded to the end of the angle bar and having an angular bracket 21 connecting the upper rear corner of the same with the upper side edge of the plate 13 to increase the rigidity of the structure.

On the power takeoff shaft 11 is mounted a sprocket 22 having a known taper lock hub, which sprocket drives through a chain 23 a smaller sprocket 24 fixed to the rear end of a forwardly extending drive-shaft 25. The drive-shaft 25 is supported by spaced bearings 26 and is contained within a housing 27 with a coupling 28 for assembly purposes, such drive-shaft housing 27 corresponding to that of a conventional automobile drive-shaft housing and being pivotally supported within a pair of spaced bearing sleeves 30 and 31 near the rear and forward ends of the housing. The sleeve 30 is attached (FIGS. 1 and 6) to an upright plate 32 having a slot 33 therein for receiving a bolt 34 and such plate is located at the rear end of the housing which extends through the mounting plate 20 at the end of the angular bracket 21. The sleeve 31 (FIG. 6) is mounted on a plate 32' having a slot 33' therein for receiving a bolt 35 at the forward end of the drive-shaft housing and the plate 32' is adjustably mounted on a bracket 38 attached to the tractor. The two bolts 34 and 35 can be loosened to vary the elevation and angularity of the drive-shaft housing. The forward end of the drive-shaft housing 27 (FIGS. 5, 6, 7 and 8) is connected to a gearbox or housing 36, which in turn is connected to a shaft housing 37 extending at right angles to the housing 27.

The drive-shaft 25 carries a bevel gear 39 within the housing 36 and such bevel gear engages a cooperating bevel gear 40 on a shaft 41 within the housing 36 and carried by spaced bearings 42 and 43 on opposite sides of the housing 36.

The opposite end of the shaft 41, at the right-hand side of the vehicle, is mounted in a bearing 44 carried by a cross-plate 45 welded to the housing 37. The plate 45 has short and long ends, the short end being attached to a shorter side bar 47 and the long end being connected to a longer side bar 48, such side bars having inner ends converging to contact the housing 37 and being secured thereto by welds 49.

An angular supplemental brace 50, which may be L-shape in cross-section for strength, is welded or otherwise secured to the bar 48 adjacent to the junction of the same with the plate 45 and to the bar 47 near the inner end of the same adjacent the housing 37. The opposite end of the brace 50 is welded or otherwise secured to the drive-shaft housing 27 so that it and the housing 37 with the shaft 41 and the brace 50 as a unit can be moved about the axis of the drive-shaft 25.

The outer ends of the bars 47 and 48 are provided with pivotal openings 51 and 52 (FIG. 1) for the reception of pivots 53 to support a banker or other operating unit having bifurcated ends 54 and 55. The operating unit is driven from the shaft 41 supported by the bearing 44 and by means of a bearing 56 fastened by bolts 57 to the cross plate 45. The bearing 56 has a set collar 58 to fasten the bearing to the shaft so that the bearing will be retained in its mounting.

The shaft 41 is connected to the operating unit by the universal joint 59 and the shear coupling plate 60 welded thereto and adapted to be attached by pins or bolts 61 to a cooperating shear coupling plate 62 mounted on the operating unit or implement shaft 63. The implement or banker shaft is mounted in end bearings 64 fastened by bolts 65 to the front flat end 66 and a generally cylindrical housing having a rear curved end 67 at the opposite end. The generally cylindrical housing has a relatively short section 68 approximately a foot in length and eighteen inches in diameter and a section 69 approximately three times the length and of slightly smaller diameter providing a housing for screw 70 welded to a double strength tube or pipe 71. The shaft 63 is received within and welded to the double strength tube 71 so that there is a small space between the tube and the shaft to prevent warping of the shaft when the tube is subjected to welding heat. The outer end of the shaft 63 is journaled in bearings 72 fastened to the end plate 67 by means of bolts 73. The shaft 63 is driven from the power take-off through the universal joint and the shear coupling.

The portion of the housing of larger diameter is provided with an opening 74 with a sharp cutting blade 75 at the side nearer the rear wheel, such side providing a scoop for soil to be moved by the screw 70 through the housing and discharged through an angular opening 76 through the side of the rear end of the housing. Within the portion of the housing of larger diameter spaced knives 77 are attached by means of bolts and nuts 78. The end of the screw 70 is provided with a triangular cutter blade 77' and these knives and blade engage and loosen the soil before it is picked up by the scoop 75.

On account of its mounting the screw housing with the screw therein can pivot relative to its support and can follow the surface of the earth over which it moves. In order to limit the depth of the scoop skids 79 on the bottoms of the spaced posts 80 are adjustable in a pair of spaced sleeves 81 welded to the arms 54 and 55. The sleeves 81 are provided with set screws 82 so that the posts may be secured in adjusted position.

The opening 76 in the housing is located in a manner to cause the discharge of earth laterally from the housing and to direct the earth from the housing in a manner to shape the discharged earth into a bank. A pair of flanges 83 and 84 are attached to the housing, the flange 83 having a portion extending downwardly and rearwardly, while the flange 84 extends outwardly and upwardly along the opening and forms a support for a spray discharge 85 with a flat extremity 86, such discharge being welded or otherwise attached to the flange 84.

The universal joint 59 is in line with the pivots 53 mounting the banker so that such banker can be raised and lowered. The banker is maintained in elevated position during transportation by safety bars 88 and 89 which are secured on the bar 48 and on the bifurcated end 55 of the operating unit, respectively, such safety bars having openings 90 and 91 adapted to be brought into alignment when the implement is in upright position and to receive a bolt or pin therethrough to prevent accidental falling of the implement.

In order to raise and lower the implement, means is provided for raising and lowering the free end of the shaft housing 37 carrying the bearing 44 and this is accomplished by means of a generally triangular connector 93 which is pivotally mounted by a bolt 94 at one corner to a lug 95 carried by the shaft housing 37. A chain 96 is connected at one end to an opening 97 in the connector 93 and the opposite end is adjustably connected by means of a threaded bolt and nut 98 through a bracket 99 on the housing for the implement. A third opening 100 is provided in the connector 93 in which is attached a cable 101 which extends over a pair of sheave wheels 102 and 103 mounted respectively on brackets 104 and 104' and connected to one of the hydraulic lift-arms 10' of the tractor so that when the lift-arm is oscillated the bracket 93 will be rotated about its pivot member 94 and the fixed member 95 to cause tightening of the chain 96 and elevating the outer end of the unit after which the entire unit will be elevated.

The bracket 104 is provided with an upstanding arm 105, preferably L-shape or of other cross-section for strength, and having a top horizontal or shelf portion 106 with a lug 107 having an opening therethrough in which is received a threaded shank 108 with nuts on opposite sides of said lug for securing said threaded shank in adjusted position. The lower end of the threaded shank 108 has attached thereto the horizontal portion of an L-shape bracket 109 having in its depending portion one or more openings 110 in which one or more coil springs 111 are engaged. The lower ends of these springs engage openings in lugs carried by the bar 47 and the angle member 50 for resiliently supporting the same and the housing 37 and associated parts.

In view of the fact that the outer end of the banker tends to overbalance the inner end, one or more balancing springs 112 are provided attached to the shaft housing 37 and by means of perforated plates 113 and with the other ends of the springs adapted to be disposed within the links of one or more chains 114 welded to the implement housing. The tension on the springs can be varied by the engagement of the springs in the different links of the chains.

The bracket 104 is provided with an angular support 115 which attaches to the tractor rear axle housing in order to withstand the force of the elevating cable on the rear pulley.

Since the power takeoff operates in a counterclockwise direction when viewed from the rear of the tractor, the drive shaft 25 is rotated in a similar direction by the chain 23. The bevel gear 39 on the end of the shaft 25 will mesh with the bevel gear 40 on the shaft 41 and cause such shaft and the implement driven thereby to rotate in the direction of the arrows in FIGS. 9 and 10 clockwise when viewed from the left side of the tractor.

A chemical spray such as liquid fertilizer or insect killer is supplied to the spray discharge 85 through a flexible hose or line 120 connected at the end opposite the discharge to a valve 121. The valve 121 receives fluid through a pipe 122 from a pump 123 which receives fluid from a pipe 124 connected to a generally cylindrical tank 125 with such fluid being fed to the pump by gravity. The tank 125 is supported by a pair of flanges 126 welded or otherwise attached to the sides thereof which are mounted by bolts 127 on one side to a frame 128 connected to the tractor 10 and on the other side to the shelf portion 106.

Fluid is adapted to be introduced into the tank through a port 129 having a cover 130 provided with a lug 131 connected by a pivot 132 to a pair of upright brackets 133 on the top of the tank 125.

The impeller of the pump 123 is driven by a shaft 135 on the opposite end of which is mounted a pulley 136. Such pulley is driven by a belt 137 from a pulley 138 mounted on the end of a shaft 139. A pulley 140 is mounted on the opposite end of shaft 139 and is driven by a belt 141 from a pulley 142 mounted on the end of the shaft 41 which extends outwardly from the gear box 36. The shaft 139 is journalled in bearings 143 mounted in a supporting framework 144 beneath the tractor 10 and held in fixed position by a set screw 145.

The valve 121 is preferably a 3-way valve and in order that the fluid being sprayed will not be wasted when the implement is not in use, the valve is adapted to by-pass the discharge line 120 and cause the fluid being pumped to pass through a line 146 and to be discharged through an opening 147 in the upper portion of the tank 125. In order to do this the valve 121 is provided with a control arm 148 having one end connected to the valve and the opposite end provided with a pin 149 having a spring 150 connected thereto and the opposite end of the spring is connected by a screw or lug 151 to the base of the tank 125. The spring 150 will normally bias the valve 121 to a position where the fluid is returned to the tank and in order to cause the fluid to be discharged through the spray discharge 85 the opposite end of the pin 149 in the control arm 148 is connected to a cable 152 which passes over a pulley 153 and is directed downwardly where it is connected to a spring 154 the opposite end of which is connected to the arm 48 so that when the implement is lowered the cable 152 will rotate the valve to a position whereby the fluid will be diverted through the flexible hose 120 to the spray discharge 85. When the implement is raised the spring 150 will return the valve to its original position and cause the fluid to flow back to the tank 125.

In the operation of the device, the tractor follows a circular path of any desired circumference around a tree or other plant. As the tractor circumscribes the plant, the banker loosens a ring of earth adjacent to the tractor, scoops up the loosened earth and a screw or auger transfers such earth toward the center of the circle where it is deposited and formed into a ring. The screw is driven through a shear coupling and universal joint connected to an adjustable right angle drive which in turn is driven by the power take-off of the tractor.

If desired the banker may be provided with a sprayer for spraying liquid fertilizer or insect killer around the plant. In order to do this a tank adapted to be filled with fluid to be sprayer is mounted on the side of the tractor. A pump, driven by a take-off from the right angle drive, is mounted adjacent to the tank and connected thereto by a gravity feed pipe. Fluid is pumped from the tank through a discharge line to a valve which directs the fluid to a spray discharge or nozzle when the banker unit is in operation or automatically returns the fluid to the tank when the unit is raised.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. The combination of a tractor having a power take-off and oscillatable lift-arms, a drive-shaft housing extending forwardly of the rear of the tractor and terminating in a gear box, means pivotally mounting said drive-shaft housing, a drive-shaft in said housing, a drive connection between said power takeoff and said drive-shaft, a bevel gear on said drive-shaft within said gear box, a driven-shaft housing connected to said gear box and pivoted therewith, a driven-shaft in said driven-shaft housing, a second bevel gear on the end of said driven-shaft engaging said bevel gear and rotating said driven-shaft in a clockwise direction, means for supporting an elongated multi-diameter housing having inlet and discharge openings at opposite ends thereof, a screw conveyor journaled lengthwise in said housing, universal joint and shear coupling means connecting said driven shaft and said screw conveyor for driving the latter in a clockwise direction, the inlet to said housing being at the bottom of the portion of maximum diameter, a scoop on the rear edge of said portion of maximum diameter, cutter means on the portion of the screw adjacent said inlet for loosening the soil so that it can be picked up by said scoop, the opening at the opposite end of said housing being on the rear side of said housing and earth directing and compacting means associated with such opening.

2. The combination of a tractor having a power take-off and oscillatable lift-arms, a drive-shaft housing extending forwardly of the rear of the tractor and terminating in a gear box, means pivotally mounting said drive-shaft housing, a drive-shaft in said housing, a drive connection between said power takeoff and said drive-shaft, a bevel gear on said drive-shaft within said gear box, a driven-shaft housing connected to said gear box and pivoted therewith, a driven-shaft in said driven-shaft housing, a second bevel gear on the end of said driven-shaft engaging said bevel gear and rotating said driven-shaft in a clockwise direction, means for supporting an elongated multi-diameter housing having inlet and discharge openings at opposite ends thereof, a screw conveyor journaled lengthwise in said housing, universal joint and shear coupling means connecting said driven shaft and said screw conveyor for driving the latter in a clockwise direction, the inlet to said housing being at the bottom of the portion of maximum diameter, a scoop on the rear edge of said portion of maximum diameter, cutter means on the portion of the screw adjacent said inlet for loosening the soil so that it can be picked up by said scoop, the opening at the opposite end of said housing being on the rear side of said housing and earth directing and compacting means associated with such opening, a spray discharge member mounted on the outer end of said housing, a fluid container mounted on said tractor, a discharge pump associated with said container and adapted to be driven by said driven shaft, valve means between said pump and said spray discharge member, a control arm on said valve for automatically directing fluid to said spray discharge member when said screw conveyor housing is in operative position and for directing said fluid back to said container when said screw conveyor housing is raised.

3. The combination of a tractor having a power take-off, an earth banking implement, means for supporting said implement to extend laterally from said tractor, said implement comprising a generally cylindrical housing having an inner end adjacent the tractor and an outer end, an inlet opening facing forwardly at said inner end of the housing and a discharge opening facing rearwardly adjacent said outer end, a screw conveyor rotatable in said housing for transferring soil outwardly along and within the housing axially from the inlet to the discharge opening, a scoop on the lower edge of the inlet opening, said implement having means for loosening the soil in advance of the scoop so that it can be picked up by the scoop, earth directing means adjacent said discharge opening, and means for driving said conveyor from the power take-off of the tractor so that as said tractor is advanced a bank of earth is formed along the path of the tractor and the discharge opening.

4. The structure of claim 3 in combination with a container for spray material mounted on the tractor, a spray discharge nozzle mounted on the implement, a flexible hose connecting the container and nozzle, and means for selectively forcing the spray material from the container to the discharge nozzle.

5. The structure of claim 3 in which the means for supporting the implement is pivoted to the tractor and free to move up and down so that the implement can follow the surface of the earth over which it moves.

6. An earth banking implement constructed for attachment to a tractor, said implement comprising an elongated generally cylindrical housing having an inner end adapted to be positioned adjacent to a tractor and an outer end, said housing having a portion at its inner end of larger diameter and the remaining portion of smaller diameter, an inlet opening facing forwardly in said portion of larger diameter, the lower edge of said inlet providing a scoop for picking up soil, a discharge opening facing rearwardly at the outer end of said portion of smaller diameter, a screw conveyor journalled in and surrounded by said housing for transferring soil from the scoop through the housing to the discharge opening, and earth directing means adjacent to said discharge opening for shaping a bank of earth as it is discharged through the discharge opening.

7. The structure of claim 6 in which a skid is adjustably mounted adjacent the inner end of the housing for controlling the position of the scoop with respect to the surface of the earth.

8. The structure of claim 6 in which a spray nozzle is secured to the housing adjacent to the discharge opening and is adapted to be supplied with spray material from a container on the tractor.

References Cited in the file of this patent

UNITED STATES PATENTS

| | | |
|---|---|---|
| 361,866 | Erwin | Apr. 26, 1887 |
| 2,148,568 | McBrady | Feb. 28, 1939 |
| 2,173,771 | Taylor | Sept. 19, 1939 |
| 2,280,846 | Pitcher | Apr. 28, 1942 |
| 2,545,016 | Berry | Mar. 13, 1951 |
| 2,547,753 | Hennigan | Apr. 3, 1951 |
| 2,857,691 | Curran | Oct. 28, 1958 |
| 2,871,804 | Pounds | Feb. 3, 1959 |

FOREIGN PATENTS

| | | |
|---|---|---|
| 745,713 | France | Feb. 21, 1933 |